United States Patent

Akata et al.

(10) Patent No.: US 10,331,976 B2
(45) Date of Patent: Jun. 25, 2019

(54) LABEL-EMBEDDING VIEW OF ATTRIBUTE-BASED RECOGNITION

(71) Applicant: Xerox Corporation, Norwalk, CT (US)

(72) Inventors: Zeynep Akata, Grenoble (FR); Florent C. Perronnin, Demene (FR); Zaid Harchaoui, Grenoble (FR); Cordelia L. Schmid, Saint Ismier (FR)

(73) Assignee: XEROX CORPORATION, Norwalk, CT (US)

( * ) Notice: Subject to any disclaimer, the term of this patent is extended or adjusted under 35 U.S.C. 154(b) by 344 days.

(21) Appl. No.: 13/923,639

(22) Filed: Jun. 21, 2013

(65) Prior Publication Data

US 2014/0376804 A1 Dec. 25, 2014

(51) Int. Cl.
*G06K 9/62* (2006.01)
*G06K 9/46* (2006.01)
*G06K 9/00* (2006.01)

(52) U.S. Cl.
CPC ....... *G06K 9/6267* (2013.01); *G06K 9/00496* (2013.01); *G06K 9/4633* (2013.01);
(Continued)

(58) Field of Classification Search
CPC .. G06K 9/00; G06K 9/00496; G06K 9/00503; G06K 9/00523; G06K 9/46; G06K 9/4633; G06K 9/4676; G06K 9/4685; G06K 9/481; G06K 9/6214; G06K 9/6219; G06K 9/6231; G06K 9/6232; G06K 9/6234; G06K 9/6235; G06K 9/6239; G06K 9/624; G06K 9/6247; G06K 9/6248; G06K 9/6255; G06K 9/6256; G06K 9/6267; G06K 9/6268;
(Continued)

(56) References Cited

U.S. PATENT DOCUMENTS 6,035,057 A * 3/2000 Hoffman ............. G06K 9/6251
382/159
7,394,947 B2 * 7/2008 Li ........................ G06K 9/6297
382/305

(Continued)

OTHER PUBLICATIONS

Thomas Mensink, Jakob Verbeek and Gabriela Csurka, "Tree-Structured CRF Models for Interactive Image Labeling", IEEE, Transactions on Pattern Analysis and Machine Intelligence, vol. 35, No. 2, Published May 2012, pp. 476-489.*

(Continued)

*Primary Examiner* — Eric Rush
(74) *Attorney, Agent, or Firm* — Fay Sharpe LLP (57) ABSTRACT

In image classification, each class of a set of classes is embedded in an attribute space where each dimension of the attribute space corresponds to a class attribute. The embedding generates a class attribute vector for each class of the set of classes. A set of parameters of a prediction function operating in the attribute space respective to a set of training images annotated with classes of the set of classes is optimized such that the prediction function with the optimized set of parameters optimally predicts the annotated classes for the set of training images. The prediction function with the optimized set of parameters is applied to an input image to generate at least one class label for the input image. The image classification does not include applying a class attribute classifier to the input image.

11 Claims, 4 Drawing Sheets

(52) U.S. Cl.
CPC ......... *G06K 9/4676* (2013.01); *G06K 9/4685* (2013.01); *G06K 9/628* (2013.01); *G06K 9/6232* (2013.01); *G06K 9/6234* (2013.01); *G06K 9/6244* (2013.01)

(58) Field of Classification Search
CPC ...... G06K 9/627; G06K 9/6277; G06K 9/628; G06K 9/6281; G06K 9/6282; G06K 9/72; G06K 9/726; G06K 2009/6236; G06K 2009/6237; G06T 9/00; G06T 9/002; G06T 9/004; G06T 9/007; G06T 9/008; G06T 9/40
USPC ....... 382/100, 115, 155, 159, 181, 190, 224, 382/226, 227
See application file for complete search history.

(56) References Cited

U.S. PATENT DOCUMENTS

| | | | | |
|---|---|---|---|---|
| 7,680,341 | B2* | 3/2010 | Perronnin | 382/224 |
| 7,756,341 | B2* | 7/2010 | Perronnin | 382/224 |
| 2005/0114325 | A1* | 5/2005 | Liu | G06F 17/30265 |
| 2006/0143175 | A1* | 6/2006 | Ukrainczyk | G06F 17/218 |
| 2010/0040285 | A1* | 2/2010 | Csurka | G06K 9/00624 |
| | | | | 382/170 |
| 2010/0189354 | A1* | 7/2010 | de Campos | G06K 9/4671 |
| | | | | 382/190 |
| 2011/0040711 | A1* | 2/2011 | Perronnin et al. | 706/12 |
| 2011/0052063 | A1* | 3/2011 | McAuley | G06K 9/6219 |
| | | | | 382/180 |
| 2012/0054130 | A1* | 3/2012 | Mensink | G06K 9/6263 |
| | | | | 706/12 |
| 2012/0054658 | A1* | 3/2012 | Chuat | G06F 17/30247 |
| | | | | 715/771 |
| 2012/0082371 | A1* | 4/2012 | Bengio | G06K 9/6282 |
| | | | | 382/159 |
| 2014/0090061 | A1* | 3/2014 | Avasarala | G06F 21/56 |
| | | | | 726/24 |

OTHER PUBLICATIONS

Yang Wang and Greg Mori, "A Discriminative Latent Model of Object Classes and Attributes", Springer Berlin Heidelberg, Computer Vision, vol. 6315, 2010, pp. 155-168.*
Steve Branson, Catherine Wah, Florian Schroff, Boris Babenko, Peter Welinder, Pietro Perona and Serge Belongie, "Visual Recognition with Humans in the Loop", Springer-Verlag Berlin Heidelberg, Computer Vision—ECCV 2010, vol. 6314, pp. 438-451.*
Myung Jin Choi, Joseph J. Lim, Antonio Torralba and Alan S. Willsky, "Exploiting Hierarchical Context on a Large Database of Object Categories", IEEE, Conference on Computer Vision and Pattern Recognition, Jun. 2010, pp. 129-136.*
Dhruv Mahajan, Sundararajan Sellamanickam and Vinod Nair, "A Joint Learning Framework for Attribute Models and Object Descriptions", IEEE, International Conference on Computer Vision, 2011, pp. 1227-1234.*
Christoph H. Lampert, Hannes Nickisch, and Stefan Harmeling, "Learning to Detect Unseen Object Classes by Between-Class Attribute Transfer", IEEE, Conference on Computer Vision and Pattern Recognition, 2009, pp. 951-958.*
Mark Palatucci, Dean Pomerleau, Geoffrey Hinton and Tom M. Mitchell, "Zero-Shot Learning with Semantic Output Codes", Advances in Neural Information Processing Systems 22 (NIPS 2009) pp. 1-9.*
Chatfield, et al. "The devil is in the details: an evaluation of recent feature encoding methods" BMVC 2011, 2011, pp. 1-12.
Douze, et al. "Combining attributes and Fisher vectors for efficient image retrieval" IEEE Conf. on Computer Vision & Pattern Recognition, 2011, pp. 745-752.
Farhadi, et al., "Describing Objects by their attributes", *IEEE Conference on Computer Vision and Pattern Recognition*, 2009, pp. 1778-1785.
Ferrari, et al. "Learning Visual Attributes" 2008, 1-8.
Kulkarni, et al. "Baby Talk: Understanding and Generating Image Descriptions" 2011 *IEEE Conference on Computer Vision and Pattern Recognition*, 2011, pp. 1601-1608.
Kumar, et al. "FaceTracer: A search engine for large collections of images with faces" *Computer Vision—ECCV* 2008, 2008, pp. 340-353.
Lampert, et al. "Learning to detect unseen object classes by between-class attribute transfer" *IEEE Conference on Computer Vision and Pattern Recognition*, 2009. CVPR 2009, pp. 951-958.
Mahajan, et al. "A joint learning framework for attribute models and object descriptions", 2011 *IEEE International Conference on Computer Vision (ICCV)*, pp. 1227-1234.
Mensink, et al. "Tree-structured CRF models for Interactive image labeling" IEEE transactions on pattern analysis and machine intelligence, 2012, pp. 1-14.
Ordonez, et al. "Im2Text: Describing images using 1 million captioned photographs" *Neural Information Processing Systems (NIPS)*, 2011, pp. 1-9.
Perronnin, et al. "Improving the fisher kernel for large-scale image classification" ECCV'10, 6314, 2010, pp. 143-156.
Sharmanska, et al. "Augmented attribute representations" *Computer Vision—ECCV* 2012, 2012, pp. 242-255.
Wang, et al. "A discriminative latent model of object classes and attributes" *Computer Vision—ECCV* 2010, 2010, pp. 155-168.
Wang, et al. "Joint learning of visual attributes, object classes and visual saliency", 2009 *IEEE 12th International Conference on Computer Vision*, 2009 pp. 537-544.
Yu, et al. "Attribute-based transfer learning for object categorization with zero or one training example" *Computer Vision—ECCV* 2010, pp. 127-140.

* cited by examiner

LABEL-EMBEDDING VIEW OF ATTRIBUTE-BASED RECOGNITION

BACKGROUND

The following relates to the image classification arts, image indexing arts, image retrieval arts, and related arts.

Image classification typically entails the operations of training a classifier using a training set of images labeled with class identifications (i.e. class labels), and then applying the classifier to an input image to be classified. This approach relies upon the availability of a suitably comprehensive training set including a suitably representative subset of images for each class of the classification system.

If a suitably comprehensive training set of labeled images is unavailable, then the effectiveness of the foregoing approach is poor for classes that are not well-represented in the training set. It is even impossible to train classifiers for those classes that do not have a single labeled sample in the training set. In such cases, a solution is to introduce an intermediate representation between the image descriptors and the classes. Attribute class descriptions are an example of such an intermediate representation. They correspond to high level image descriptors that are meaningful for, and shared across, multiple classes. By way of illustrative example, attributes for classifying images of animals could be "has paws", "has wings", "has four legs", "has snout", "is underwater", and so forth. The standard approach to perform image classification with attribute descriptions is a two-step process, known as Direct Attribute Prediction (DAP). DAP employs image attribute-level classifiers to compute image attribute probabilities for the image (one classifier per image attribute); followed by a Bayesian classifier computing class probabilities based on image attribute probabilities output by the image attribute classifiers.

The use of DAP enables classification of images into classes for which there are no examples in the training set. Such "zero shot" learning relies upon characterization of the class by the image attributes that images belonging to the class exhibit (or lack).

BRIEF DESCRIPTION

In some illustrative embodiments disclosed as illustrative examples herein, a non-transitory storage medium storing instructions readable and executable by an electronic data processing device to perform a method including the operations of: representing classes of a set of classes $Y=\{y_j, j=1, \ldots, C\}$ by class attribute vectors $\varphi(y_j)$ where $\varphi$ is an embedding function that embeds a class in an attribute space of dimensionality E where each dimension $a_i$, $i=1, \ldots, E$ of the attribute space corresponds to a class attribute; representing training images $x_n$ of a set of training images S labeled by respective training image class labels $y_n$ as $\theta(x_n)$ where $\theta$ is an embedding function that embeds an image in an image feature space of dimensionality D; optimizing respective to the set of training images S a set of parameters w of a prediction function $$f(x; w) = \underset{y \in Y}{\mathrm{argmax}}\, F(x, y; w)$$

where x denotes an image and y denotes a class of the set of classes Y and F denotes a compatibility function measuring compatibility of the image x with the class y; and applying the prediction function $f(x;w)$ with the optimized set of parameters w to an input image to generate at least one class label for the input image.

In some illustrative embodiments disclosed as illustrative examples herein, a method comprises: embedding each class of a set of classes in an attribute space where each dimension of the attribute space corresponds to a class attribute, the embedding generating a class attribute vector for each class of the set of classes; optimizing a set of parameters of a prediction function operating in the attribute space respective to a set of training images annotated with classes of the set of classes such that the prediction function with the optimized set of parameters optimally predicts the annotated classes for the set of training images; and applying the prediction function with the optimized set of parameters to an input image to generate at least one class label for the input image. The method is suitably performed by an electronic data processing device.

In some illustrative embodiments disclosed as illustrative examples herein, an apparatus comprises an electronic data processing device programmed to perform a method including the operations of: embedding classes of a set of classes $Y=\{y_j, j=1, \ldots, C\}$ in an attribute space of dimensionality E where each dimension $a_i$, $i=1, \ldots, E$ of the attribute space corresponds to a class attribute; embedding training images $x_n$ of a set of training images S labeled by respective training image class labels $y_n$ in an image feature space of dimensionality D; optimizing a set of parameters w of a prediction function $y=f(x;w)$ operating in the image feature space and in the attribute space respective to the set of training images S wherein x denotes an image and y denotes the predicted class label for the image x; and applying the prediction function $y=f(x;w)$ with the optimized set of parameters w to an input image to generate at least one class label for the input image.

DETAILED DESCRIPTION

It is recognized herein that Direct Attribute Prediction (DAP) has certain disadvantages. The two-step prediction process learns the image attribute classifiers independently of the end-task (image classification). As a consequence, the image attribute classifiers are optimal for predicting image attributes, but are not necessarily optimal for predicting class labels for images.

DAP is also difficult to incrementally train. That is, DAP is not readily improved incrementally as new training samples become available. This is especially problematic for classes having few or no examples in the initial training set, since utilizing availability of even one or a few examples as they become available would be expected to provide substantial improvement in prediction for those classes. Still further, DAP cannot readily incorporate information which cannot be represented as discrete (e.g. binary) image attributes. For example, DAP cannot readily use continuous attribute-class associations, for instance in the [0,1] range. Such continuous values first have to be binarized to be used by the DAP algorithm, which incurs a loss of information. As another example, a semantic hierarchy of classes embodies useful information for classification insofar as images of classes which are close in a semantic hierarchy are usually more similar than images of classes which are far apart in the hierarchy.

Disclosed herein are improved image classification techniques that overcome the foregoing deficiencies of DAP recognized herein, and that provide additional advantages. Rather than a two-step process of classifying the input image respective to each of its image attributes and then classifying it based on the outputs of the image attribute classifiers, the disclosed approaches represent the classes by their attributes (which may be image attributes of images belonging to the class, or more generally may be other types of class attributes). Conceptually, this can be seen as embedding the classes in an attribute space. The attributes may be binary attributes, but can also be multi-valued or can assume continuous values. The assignment of attributes (or attribute probabilities) to the classes can be done in an automated fashion (e.g. training a classifier for each attribute, applying it to labeled training images of a given class, and generating the attribute value for the class based on the classifier outputs. Alternatively, however, since the task here is to label each class as to its attributes, and those attributes are typically semantically meaningful, in an alternative approach the attributes of each class are assigned manually. In the continuing example of a classifier for classifying images respective to depicted animal, dogs are known to have paws, and so for the "dogs" class a high probability can be assigned for the attribute "has paws". (Alternatively, if the "has paws" attribute has a value equal to the number of paws visible in the image, the value may be close to three or four). In such a task, the human annotator can select the attribute values without reference to any images (e.g. based on the knowledge that a dog has four paws and most or all of them are likely to be visible in most dog images), or alternatively may review some representative images belonging to the class in determining the attribute value (for example, to better estimate how many of a dog's four paws visible in a typical image of a dog). The manual annotation process is thus simplified since the attribute annotation is done only once per class, rather than for each training image of the set of training images.

With the attributes assigned to each class, a (single) classifier is then trained to maximize "compatibility" of the image with the "best-fit" class as represented in the attribute space. This classifier is suitably trained using a set of training images that are manually labeled as to their classes, but are not necessarily manually labeled as to their attributes. The resulting trained classifier is then ready for use in inference problems, i.e. to assign a class to an unlabeled input image.

The image classification problem is suitably formulated as follows: given an image, it is desired to annotate it with one (or multiple) class label(s) describing its visual content. Image classification is a prediction task where the goal is to learn from labeled data a function $f:X \rightarrow Y$ which maps an input x in the space of images X to an output y in the space of class labels Y. The disclosed image classification approaches are applicable even in the case where there are no (positive) labeled samples for some of the classes and it is nonetheless still desired to make a class prediction. This situation is generally referred to as zero-shot learning.

An intermediate space A referred to as attribute layer is employed. Attributes correspond to high-level properties of the objects which are shared across multiple classes, which have semantic meaning in that the image attribute can be recognized by a human viewer. As an example, if the classes correspond to animals, possible attributes include "has paws", "has stripes", or so forth.

The image classification techniques disclosed herein employ a class (label) embedding framework. This should be distinguished from the known technique of generating a feature vector representing an image, which can be viewed as embedding images in a vector space. While such "image embedding" may be employed in conjunction with the disclosed approaches (and indeed is so employed in the illustrative examples), this is distinct from the class embedding disclosed herein. In class embedding, each class $y \in Y$ is embedded in a space of attribute vectors; accordingly, the disclosed techniques are sometimes referred to herein as "Attribute Label Embedding (ALE)". A function $F(x,y;w)$ is employed, which measures the "compatibility" between an image x and a label y given a model represented by model parameters w which are learned on a training set of labeled samples to ensure that, given an image, the correct class(es) rank higher than the incorrect ones. In the inference phase, given an unlabeled input image to be classified, the classifier operates by identifying the class that maximizes the compatibility function F for the input image using the optimized model parameters.

ALE addresses in a principled fashion various problems with conventional two-step DAP classification. The disclosed ALE approach does not entail solving any intermediate (i.e. attribute-level) problem; instead, the model parameters w are learned to directly optimize the class ranking. Also, if labeled samples for a given class subsequently become available those samples can be added incrementally to update the class embedding in the vector space. Still further, the label embedding framework disclosed herein is generic and is not restricted to attributes. Other sources of prior information, such as image classification hierarchy, can be combined with attributes. (As used herein, the term "attributes" is broadly construed as encompassing any prior information including both conventional attributes and other prior information such as class hierarchy information).

Conventionally, attributes have been used to describe images, for example to generate captions, for image retrieval, classification, and so forth. In these tasks, the attributes are assigned to images. In the ALE techniques disclosed herein, the classes are labeled with attributes. Images are labeled with attributes, if at all, only as an intermediate for assigning attributes to the classes. In some embodiments, the ALE never explicitly assigns attributes to any images—for example, a human labeler can assign attributes to classes directly based on semantic knowledge of the class (e.g., the class "dogs" is strongly associated with the "has paws" attribute, whereas the class "fishes" is not at all associated with the "has paws" attribute).

Conceptually, in zero-shot learning, knowledge is transferred from classes for which training data are available to classes for which little or no training data are available. Conventionally, the image attributes are used for this purpose. More generally, it is recognized herein that the concept of class-level attributes (rather than image-level attributes) enables expansion of the concept of "attributes" beyond image-specific attributes, so that the "attributes" as disclosed herein encompass both image-specific attributes (e.g. "has paws") and other types of attributes such as semantic class taxonomies, image metadata of various types, and so forth.

Figure 1:
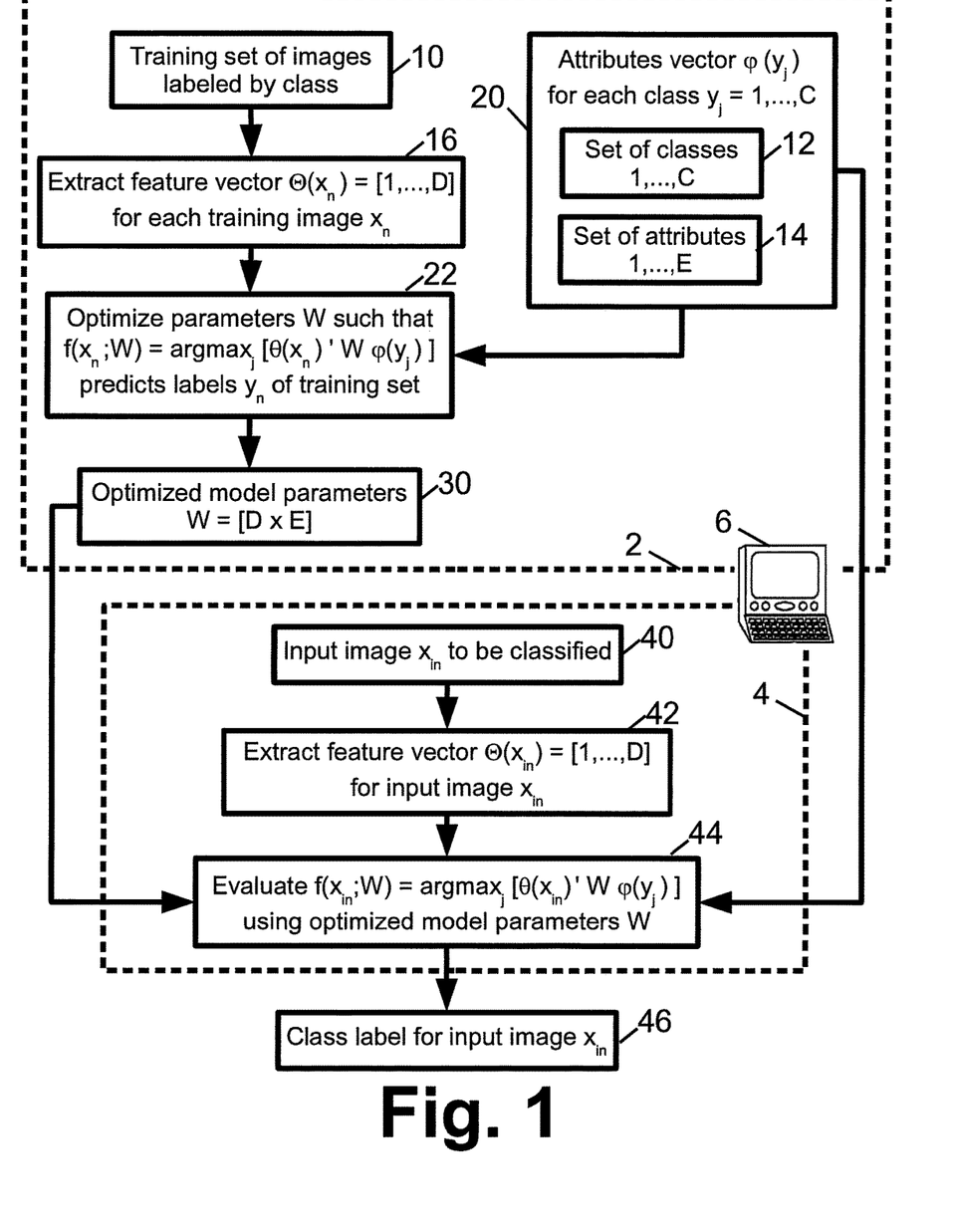
FIG. 1 diagrammatically shows an image classifier system.

With reference to FIG. 1, the classification process includes a model learning phase 2 and an inference phase 4.

The two phases 2, 4 are suitably implemented by an electronic data processing device such as an illustrative computer 6. The illustrative image classifier of FIG. 1 implements both the learning phase 2 and the inference phase 4 using suitably programming executed on a single computer 6; alternatively, separate computers can be programmed to perform the learning phase 2 and inference phase 4, respectively. It will also be appreciated that the disclosed classification approaches are suitably embodied as a non-transitory storage medium storing instructions readable and executable by the illustrative computer 6 or other electronic data processing device to perform the disclosed learning and/or inference phases 2, 4. The computer instructions for implementing the learning and inference phases 2, 4, respectively, can be stored on the same non-transitory storage medium or on different non-transitory storage media. Such non-transitory storage medium/media may, by way of illustrative example, include: a hard disk or other magnetic storage medium; an optical disk or other optical storage medium; random access memory (RAM), read-only memory (ROM), flash memory, or another electronic storage medium; various combinations thereof; or so forth. Such storage medium/media may be integrated with the computer 6 or other data processing device (e.g. as an internal hard drive, on-board RAM or additional RAM provided via an expansion slot, et cetera) or may be accessed via a cable or digital data network (e.g. an external hard drive connected with the computer 6 by a USB cable, a redundant array of independent disks (RAID) accessed via a wired, wireless, or combined wired/wireless local area network, and/or via the Internet, et cetera.

The interference phase 2 operates on a training set of images 10 which are labeled by class, where the class labels are drawn from a set of classes 12. Without loss of generality, the set of classes 12 is denoted Y and is assumed to include C classes indexed by a class index, e.g. running 1, . . . , C. In other words, the set of classes 12 is suitably written as $Y=\{y_j, j=1, \ldots, C\}$. Each class is characterized by attribute values for a set of attributes 14. Without loss of generality, the set of attributes 14 is assumed to include E attributes indexed by an index, e.g. running 1, . . . , E.

For the purpose of computational processing, images are converted to representative image vectors. Thus, the learning phase 2, includes an operation 16 in which a representative feature vector $\theta(x_n)=[1, \ldots, D]$ is extracted for each training image $x_n$ where (again without loss of generality) the feature vectors are assumed to be D-dimensional (i.e. there are D features or vector elements in each image vector). A class (label) embedding 20 represents each class $y_j$, j=1, . . . , C by an attribute vector $\varphi(y_j)=[1, \ldots, E]$.

Figure 2:
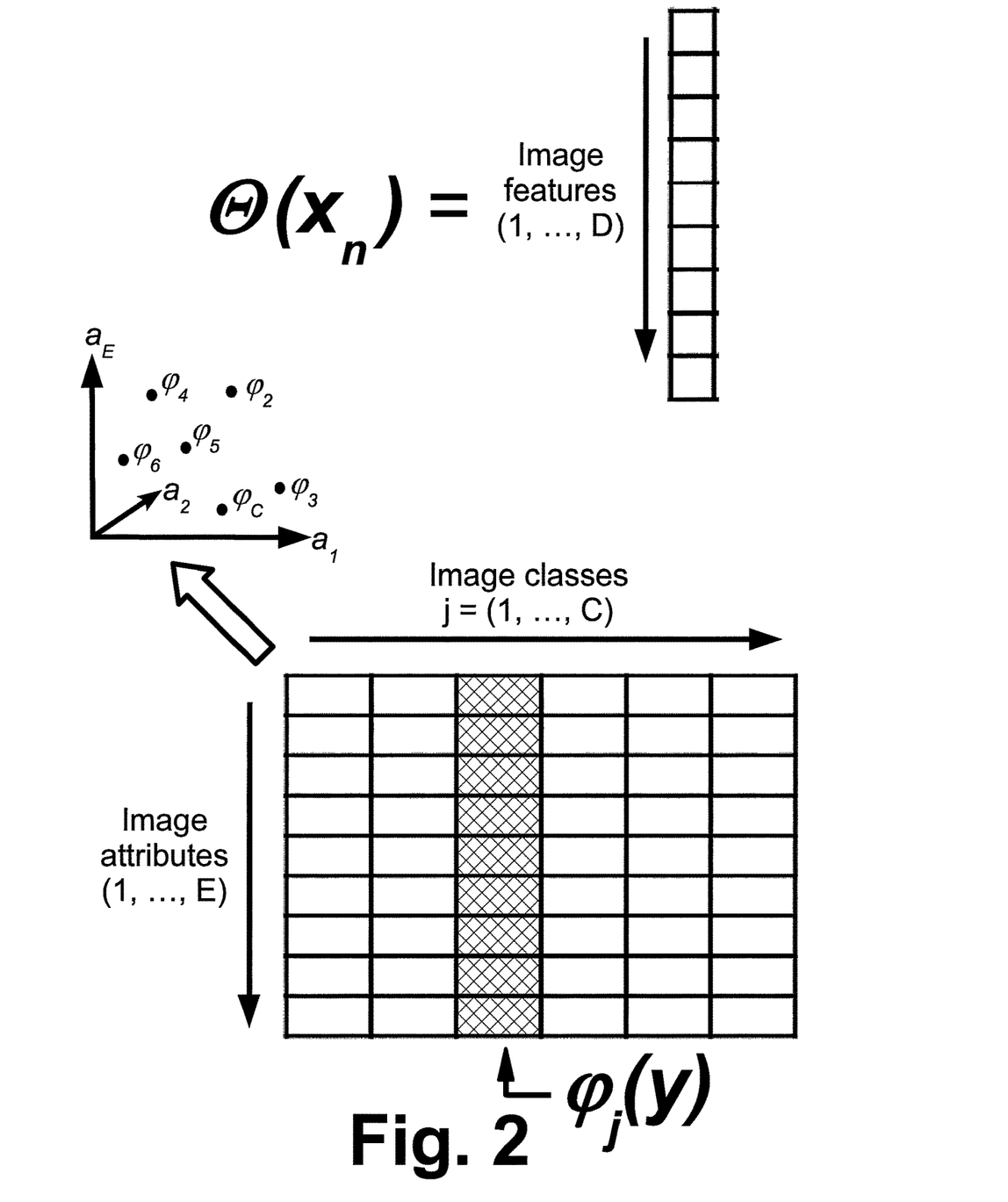
FIGS. 2-4 diagrammatically show data structures and data processing performed by the image classifier system of FIG. 1.

With brief reference to FIG. 2, these data structures are diagrammatically illustrated. The top portion of FIG. 2 illustrates the image feature vector $\theta(x_n)=[1, \ldots, D]$ for one training image $x_i$. The bottom portion of FIG. 2 shows an [E×C] array formed by the attribute vectors $\varphi(y_j)=[1, \ldots, E]$ for the C classes, with the attribute vector $\varphi(y_j)$ for an illustrative class $y_j$ highlighted by cross-hatching. Also shown by inset in FIG. 2 is a diagrammatic visualization of the attributes vector space, showing the attributes dimensions corresponding to the E attributes denoted $a_1, \ldots, a_E$ and the C classes represented in this vector space by C points $\varphi(y_1), \ldots, \varphi(y_C)$.

By choosing a suitable embedding function φ, the class (label) embedding provides an effective way to share parameters (i.e. attributes) between classes. The embedding function φ can be generated in various ways, and can in general be: fixed and data-independent, learned from data, or computed from side information. An example of a data-independent embedding is kernel dependency estimation. See Weston et al., "Kernel dependency estimation" in NIPS, 2002 This is an example of a strategy where φ is data-independent and defined implicitly through a kernel in the class space Y. Another example is the compressed sensing approach in which φ corresponds to random projections. See Hsu et al., "Multi-label prediction via compressed sensing" in NIPS, 2009.

Examples of learned embeddings are as follows. In one approach, an embedding is directly learned from the input to the output (or from the output to the input) as is the case of regression. See Palatucci et al., "Learning with semantic output codes" in NIPS, 2009. Another approach is to jointly learn θ and φ to embed the inputs and outputs in a common intermediate space Z. One example is Canonical Correlation Analysis (CCA), which maximizes the correlation between inputs and outputs. See Hastie et al., "The Elements of Statistical Learning (2nd ed., Springer Series in Statistics. Springer, 2008).

In a preferred approach, the embedding φ is constructed from side information, such as image attributes (i.e., semantically meaningful image characteristics) known to be associated with a certain class or classes; class hierarchy information derived from a hierarchical relationship of the classes Y, or so forth. This approach is suitable when little training data is available, as side information and the derived embeddings can compensate for the lack of data. Side information can be obtained at an image level (but is associated with a class or classes, i.e. serves as a class attribute) or at a class level. A straightforward approach is to employ side information at the class level based on semantic characteristics (attributes) expected for images belonging to the class. For example, side information may include image attributes such as "hand-drawn", "has paws", "including sky", "low contrast", or so forth; metadata such as annotated textual descriptions; class taxonomies; and so forth.

In sum, the inputs to the learning process include: the set of training images 10, suitably represented here as training set $S=\{(x_n, y_n), n=1 \ldots N\}$ (where without loss of generality there are assumed to be N training images indexed n=1, . . . , N) and the set of classes 12 embedded in an attribute space defined by a set of attributes 14 to form class attributes vectors 20 denoted $\varphi(y_j)=[1, \ldots, E]$, j=1, . . . , C where E is the number of attributes and C is the number of classes. The training images are processed by the feature extraction operation 16 to generate image vector representations $\theta(x_n)$, n=1, . . . , N. The training images are denoted $x_n \in X$ (where X is the space of images) and the class labels are denoted $y_n \in Y$ (where Y is the space of class labels). The goal of prediction is to learn a function $f: X \to Y$ by minimizing an empirical risk of the form $$\frac{1}{N}\sum_{n=1}^{N}\Delta(y_n, f(x_n))$$

where $\Delta: Y \times Y \to \mathbb{R}$ measures the loss incurred from predicting $f(x)$ when the true label is y. In the following illustrative examples, the loss is assumed to be a 0/1 loss: $\Delta(y,z)=0$ if y=z, 1 otherwise. The embedding functions $\theta: X \to \mathbb{R}^D$ (image vector representations) and $\varphi: Y \to \mathbb{R}^E$ (attribute vector embeddings of classes) are employed for the input images and output class labels, respectively. The training set can thus be written as a set $S=\{\theta(x_n), \varphi(y_n)\}$, n=1, ..., N where all values are known since the training images are given, image vector embedding function θ is a deterministic image feature vector generation function, the class labels $y_n$ are provided by manual annotation of the training images, and the class attribute embedding function φ is generated by manual ascribment of attribute values to the various classes $y_j$, j=1, ..., C and/or by an automated process such as kernel dependency estimation.

With continuing reference to FIG. 1, in an operation 22 the parameters of a model relating image to class label are learned. The goal is to learn a prediction function $f(x;w)$ such that for an input image x and learned model parameters w the value $f(x;w)$ equals the "correct" class label (or labels, in multi-label classification) that would (in a probabilistic sense) be assigned by a human annotator. Using the learning data, this amounts to maximizing a likelihood of $y_n=f(x_n;w)$ over the training set S. In the illustrative embodiments, this is written more formally as:

$$f(x;w) = \underset{y \in Y}{\mathrm{argmax}}\, F(x,y;w) \qquad (1)$$

where w denotes a model parameter vector of F and F(x,y;w) measures how compatible is the pair (x,y) given w. For computational convenience, in the illustrative embodiments it is assumed that F is linear in some combined feature embedding of inputs/outputs ψ(x,y):

$$F(x,y;w)=w'\psi(x,y) \qquad (2)$$

Figure 3:
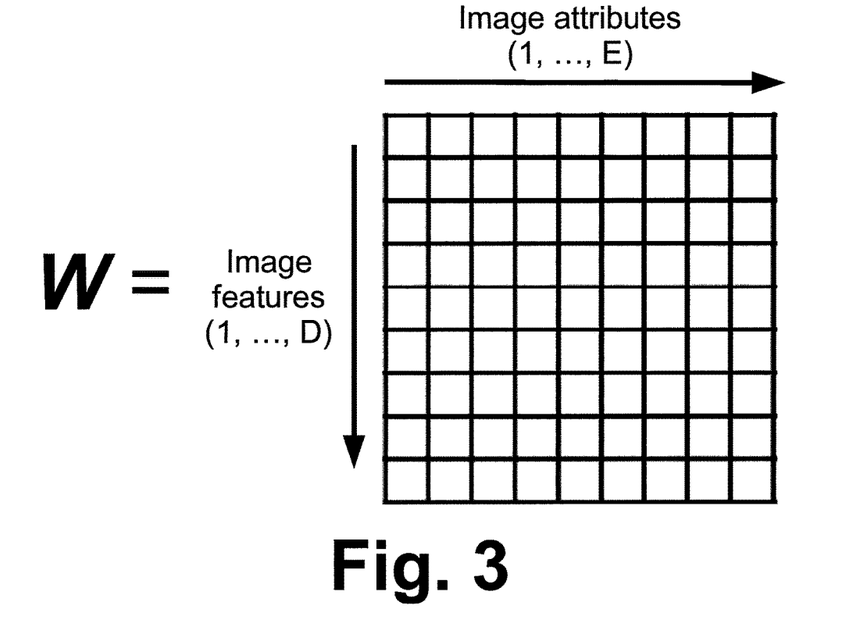
Figure 4:
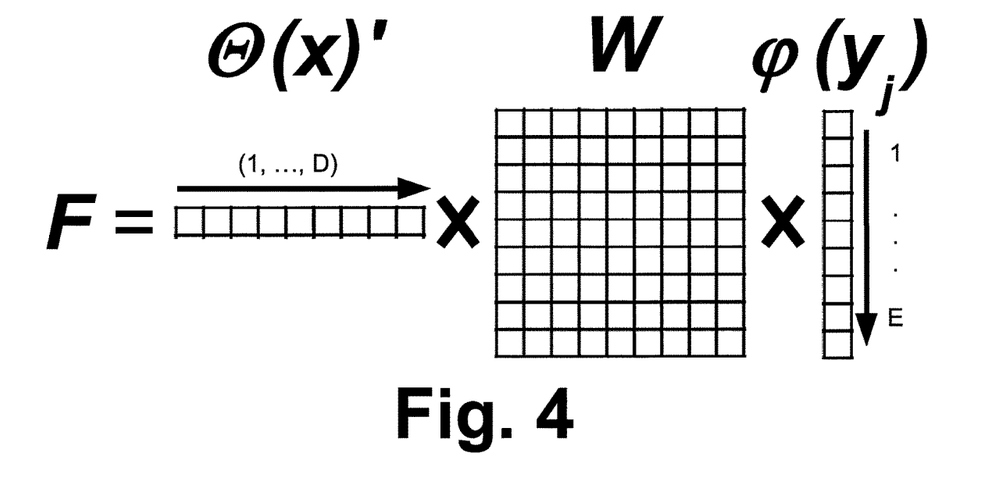

With reference to FIGS. 3 and 4, it is further assumed that the joint embedding ψ can be written as the tensor product between the image embedding θ: $X \to \mathbb{R}^D$ and the label embedding φ: $Y \to \mathbb{R}^E$:

$$\psi(x,y)=\theta(x) \otimes \varphi(y) \qquad (3)$$

and ψ(x,y): $\mathbb{R}^D \times \mathbb{R}^E \to \mathbb{R}^{DE}$. In this case w is a DE-dimensional vector which can be reshaped into a D×E matrix W, as diagrammatically shown in FIG. 3. Consequently, F(x,y;w) can be rewritten as a bilinear form:

$$F(x,y;W)=\theta(x)'W\varphi(y). \qquad (4)$$

FIG. 4 diagrammatically shows the expression of Equation (4).

In the illustrative examples set forth herein, the compatibility function as expressed in Equation (4) is used. However, for completeness it is noted that other compatibility functions be used. For example, the function:

$$F(x,y;W)=-\|\theta(x)'W-\varphi(y)\|^2 \qquad (5)$$

is typically used in regression problems. If D and E are large, it might be advantageous to consider a low-rank decomposition W=U'V to reduce the number of parameters. In such a case, the compatibility function can be written:

$$F(x,y;U,V)=(U\theta(x))'(V\varphi(y)) \qquad (6)$$

The Attribute Label Embedding (ALE) φ for embedding a class (label) $y_n$ in the attribute space defined by the attributes $a_1, \ldots, a_E$ is now revisited. It is again assumed without loss of generality that there are C classes, Y={1, ..., C}, and that there is a set of E attributes A={$a_i$, i=1 ... E} to describe the classes. It is further assumed that an association measure $\rho_{y,i}$ between each attribute $a_i$ and each class y is provided. These associations may be binary, or may be real-valued if information about the association strength is available. (For example, although almost all dogs have four paws, a given image of a dog may show fewer than all four paws, and some images of a dog may show no paws at all). In the case of an attribute such as "is underwater", this will be true for most images of fishes; yet in some cases a fish may be imaged out of water. As another example, in the case of a "frog" class, the fraction of images satisfying the "is underwater" attribute may be only around 50% or so.) The illustrative examples disclosed herein focus on binary relevance for simplicity; however, one advantage of the label embedding framework disclosed herein is that it can readily accommodate real-valued relevances. The illustrative examples embed class y in the E-dimensional attribute space as follows:

$$\varphi^A(y)=[\rho_{y,1}, \ldots, \rho_{y,E}] \qquad (7)$$

where the superscript A indicates the embedding function $\varphi^A$ embeds the class y in the attribute space A={$a_i$, i=1 ... E}. Further denote as $\Phi^A$ the E×C matrix of attribute embeddings which stacks the individual $\varphi^A(y)$ vectors (see illustrative matrix in FIG. 2). It is noted that in Equation (4) the image and label embeddings θ and φ play symmetric roles. In some embodiments, the output vectors $\varphi^A(y)$ are normalized. In the illustrative examples herein, normalization approaches including mean-centering and $l_2$-normalization are employed, although other normalizations are contemplated, as is the omission of normalization. If attributes may be redundant, it can be advantageous to decorrelate them. In such a case, the compatibility function of Equation (6) is suitably utilized, with matrix V being learned from labeled data jointly with U. As another alternative, the decorrelation can be learned first, by performing a Singular Value Decomposition (SVD) on the $\Phi^A$ matrix, and then to learn U.

The function θ: $X \to \mathbb{R}^D$ (corresponding to operation 16 of FIG. 1) is a feature extraction function which takes as input an image and outputs a D-dimensional vectorial image signature. Any feature extraction method that outputs an image feature vector representative of the image can be employed. In illustrative examples herein, the feature extraction uses a bag-of-patches framework, in which low-level descriptors are extracted from local patches at multiple scales and statistics are computed for each patch descriptor. These patch statistics are then aggregated at an image level. In the illustrative examples the patch statistics are computed using the Fisher Vector (FV) principle which assumes a generative model of patches (a Gaussian Mixture Model or GMM in examples herein) and measures the gradient of the log-likelihood of the descriptors with respect to the model parameters.

With returning reference to FIG. 1, the model parameters w are estimated in operation 22 from a labeled training set S generated from the training set 10. A suitable approach is to maximize directly the compatibility between the input and output embeddings $$\frac{1}{N}\sum_{n=1}^{N} F(x_n, y_n; W),$$

with potentially some constraints and regularizations on W. It should be noted that, as used herein, terms such as "optimize", "maximize", and similar phraseology do not necessarily require obtaining the absolute global optimum, absolute global maximum, et cetera. Rather, terms such as "optimize", "maximize", and similar phraseology as used herein also encompasses optimization or maximization processes that may locate a local (rather than global) optimum or maximum, and moreover may employ termination criteria that cause the optimization or maximization process to terminate at some point prior to reaching the precise (global or local) optimum or maximum.

In illustrative examples disclosed herein, a ranking algorithm can be used to optimize the set of parameters W. See Weston et al., "Large scale image annotation: Learning to rank with joint word-image embeddings", ECML, 2010. The ranking algorithm learns jointly image and label embeddings from data to optimize classification accuracy. The ranking algorithm of Weston et al. has the following objective function. Let $1(u)=1$ if u is true and 0 otherwise. Let $l(x_n,y_n,y)=\Delta(y_n,y)+F(x_n,y;W)-F(x_n,y_n;W)$ and let $r_\Delta(x_n,y_n)= \Sigma_{y\in Y} 1(l(x_n,y_n,y)>0)$ be an upper-bound on the rank of label $y_n$ for image $x_n$. Weston et al. consider the following ranking objective:

$$R(S; W, \Phi) = \frac{1}{N}\sum_{n=1}^{N} \gamma_{r_\Delta(x_n,y_n)} \sum_{y\in Y} \max\{0, \ell(x_n, y_n, y)\} \quad (8)$$

where $\gamma_k$ is a decreasing function of k. Maximizing Equation (8) drives correct labels to rank higher than incorrect labels. A decreasing $\gamma_k$ ensures that more importance is given to the top of the ranking list, which is a desirable property. Weston et al., ECML, 2010 optimize the objective function of Equation (8) with respect to W and Φ with constraints on the norms of W and Φ. This algorithm is generally referred to as WSABIE. In WSABIE, the label embedding space dimensionality is a parameter to tune.

As disclosed herein, the WSABIE objective can be adapted to zero-shot learning in the ALE framework disclosed herein. In such a case, (1) cannot be learned from labeled data (contrary to WSABIE), but instead relies on side information. Therefore, the matrix Φ is fixed and set to $\Phi^A$ (where the class attribute vectors for the C classes are grouped as columns to form a [E×C] matrix, e.g. as diagrammatically shown in FIG. 2). With $\Phi=\Phi^A$ fixed, the objective function of Equation (8) is only optimized with respect to W.

When Φ is fixed and only W is learned, the objective of Equation (8) is closely related to the (unregularized) structured SVM (SSVM) objective:

$$\frac{1}{N}\sum_{n=1}^{N} \max_{y\in Y} \ell(x_n, y_n, y) \quad (9)$$

See Tsochantaridis et al., "Large margin methods for structured and interdependent output variables", JMLR, 2005. The main difference is the loss function. SSVM uses a multiclass objective function, and it only considers rank 1 while WSABIE considers all ranks in a weighted fashion. The SSVM multi-class objective function can also be used to learn the parameters w.

As further disclosed herein, the WSABIE and SSVM objectives can be adapted to the case where both labeled data and side information are available. In such a case, it is desired to learn the class embeddings, using $\Phi^A$ as prior information. The objective of Equations (8) or (9) are then modified by adding a regularize r:

$$R(S; W, \Phi) + \frac{\mu}{2}\|\Phi - \Phi^A\|^2 \quad (10)$$

and is optimized jointly with respect to W and Φ.

As for the optimization, both in the zero-shot and few-shots learning, Stochastic Gradient Descent (SGD) can be employed See for instance Bottou and Bousquet, "The Tradeoffs of Large Scale Learning", NIPS, 2007. However, other optimization algorithms are alternatively contemplated. In general, the optimization operation 22 can employ various optimization criteria, such as (by way of nonlimiting illustrative examples) one of the following objectives: a ranking objective (as is the case of WSABIE); a multiclass objective (as is the case of the structured support vector machine or SSVM objective), a ridge regression (RR) or other regression objective. The objective is constructed such that when the objective is maximized (or optimized) respective to the parameters w, the prediction function $y=f(x;w)$ with the optimized set of parameters optimally predicts the annotated classes for the set of training images S. The objective is typically optimized using an iterative improvement technique such as SGD, a least squares (e.g. Levinberg-Marquardt) iterative optimization, or so forth.

As previously noted, the class attributes can be image attributes, but additionally or alternatively can include other types of attributes (i.e., various side information generally). One example is that of structured learning with a taxonomy of classes. See Tsochantaridis et al., "Large margin methods for structured and interdependent output variables", JMLR, 2005. Assuming that a hierarchy of classes is organized in a tree structure, meaning that an ordering operation ≺ in Y is defined, a parameter $\xi_{y,z}=1$ if $z \prec y$ or $z=y$ can be defined. The hierarchy embedding $\varphi^H(y)$ can be defined as the C dimensional vector:

$$\varphi^H(y)=[\xi_{y,1}, \ldots, \xi_{y,C}] \quad (11)$$

In Equation (11), the superscript H indicates the class attributes $\xi_{y,-}$ are class hierarchy attributes. In the case where classes are not organized in a tree structure but form a graph, then other types of embeddings could be used, for instance by performing a kernel PCA on the commute time kernel. See Saerens et al., "The principal components analysis of a graph, and its relationships to spectral clustering", in ECML, 2004.

More generally, different embeddings can be combined in the label embedding framework, through concatenation of the different embeddings or through more complex operations such as a CCA of the embeddings. By contrast, conventional two-step DAP image classification cannot readily accommodate other sources of prior information.

With returning reference to FIG. 1, the output of the learning phase 2 is the set of optimized model parameters 30, which in some embodiments is represented by the matrix W of dimensions [D×E] diagrammatically shown in FIG. 3. This representation explicitly associates image features (the rows of the W matrix) with class attributes (the columns of the W matrix). However, these associations are generated implicitly during optimization of the parameters matrix W with respect to the compatibility function $F(x_n,y_n;W)$ taken over all N training images of the training set 10 as per the optimization operation 22. Moreover, it is noted that the optimized parameters can be represented in other formats, e.g. generally denoted as w in Equation (1).

In the inference phase 4, the optimized model parameters 30 are used to label an input image 40 to be classified. Without loss of generality, the input image is denoted $x_{in}$. Toward this end, in an operation 42 an image feature vector $\theta(x_{in})$ representing the image $x_{in}$ is computed. The operation 42 uses the same feature extraction algorithm as is employed in operation 16 of the learning phase 2, and the resulting image features vector $\theta(x_{in})$ representing the image $x_{in}$ also has D dimensions (i.e. D features or vector elements). In an operation 44, the prediction function of Equation (1) is applied to the image feature vector $\theta(x_{in})$ representing the image $x_{in}$, and the output, namely the class $y \in Y$ that maximizes the argument $F(x_{in},y;w)$, is chosen as the class label 46 for the input image 40. Alternatively, in a multiclass classifier, one or more classes having the highest ranking as measured by the compatibility function $F(x_{in},y;w)$ are chosen as the class label(s) 46. The class selection can suitably employ a "top-K" criterion where the K highest ranked classes are chosen, or a threshold can be employed, e.g. the input image 40 is labeled with any class for which $F(x_{in},y;w) \geq T_{th}$ where $T_{th}$ is a selection threshold. In the operation 44, the optimized model parameters 30 output by the learning phase 2 are used as the parameters w in the inference phase 4, and the class attributes vectors $\varphi(y_j)$, j=1, ..., C are the class attributes vectors 20 of the learning phase 2.

The class labels 46 can be used for various purposes (not illustrated), such as: to label the input image 40 for cataloging (e.g. for storing the image, or a pointer to the image, in an images database structured by image class); for image retrieval (e.g., based on the class or classes 46 identified for the input image 40, an images database is searched and images with the same or similar labeling are retrieved); for image annotation (e.g., if the image 40 is embedded in a multi-modality document including text and images, the class or classes 40 may be used to annotate the image 40 in the document); or so forth.

The disclosed image classification techniques have been reduced to practice and applied for classifying images. A summary of such experiments and summarized results are set forth in the following.

Tests were performed on two public datasets. The first dataset, Animal With Attributes (AWA) (Lampert et al., "Learning to detect unseen object classes by between-class attribute transfer", in CVPR, 2009) contains roughly 30,000 images of 50 animal classes. Each class was annotated with 85 attributes by 10 annotators (Osherson et al., "Default probability", Cognitive Science, 1991) and the result was binarized (although this is not a requirement, as the disclosed ALE technique also works with continuous attributes). The CUB-200-2011 dataset (Wah et al., "Multiclass recognition and part localization with humans in the loop", in ICCV, 2011) contains roughly 11,800 images of 200 bird classes. Each class is annotated with 312 binary attributes derived from a bird field guide website. Hence, there is a significant difference in the number and quality of attributes between the two datasets. On both datasets, to be consistent throughout the zero-shot and few-shots experiments, half of the data for each class was used for training and the other half for testing. Results are reported in terms of top-1 accuracy (in %) averaged over the classes. The image features used for the image feature vectors θ are as follows. 128-dimensional SIFT descriptors (Lowe, "Distinctive image features from scale-invariant keypoints", IJCV, 60:91-110, 2004) were extracted, and 96-dimensional color descriptors (Clinchant et al., in ImageEval Workshop at CVIR, 2007) were extracted from regular grids at multiple scales. Both sets of features were reduced to 64-dimensions using principal component analysis (PCA). These descriptors were then aggregated into an image-level representation using the Fisher Vector (FV) approach (Perronnin et al., "Improving the Fisher kernel for large-scale image classification" in ECCV, 2010). Using a Gaussian Mixture Model (GMM) with 256 Gaussian components, one SIFT Fisher vector and one color Fisher vector per image was computed, and the two Fisher vectors were concatenated into a 65,536-dimensional Fisher vector which was compressed with product quantization (PQ). See Jégou et al., "Product quantization for nearest neighbor search", IEEE TPAMI, 2011 These Fisher vectors were the image embeddings $\theta(x)$.

Evaluation of the ALE approach disclosed herein in the zero-shot setting was as follows. For the AWA dataset, the standard zero-shot setup was used, in which parameters are learned on 40 classes and accuracy is evaluated on 10 classes. In these experiments, the "train" part of the 40 learning classes was used to learn and cross-validate the model parameters. The "test" part of the 10 evaluation classes was then used to measure accuracy. For the CUB dataset, 150 classes were used for learning (using again the "train" part for training and cross-validation) and 50 classes were used for evaluation (using only their "test" part). The following questions were considered. What is the best way to learn the parameters w of the model? What is the best way to encode/normalize the attribute embeddings φ? How does ALE compare to DAP? Does ALE still learn human-interpretable attribute classifiers (albeit indirectly)? How do image attributes compare to class hierarchy attributes as prior information for the ALE approach?

Comparison of the learning framework disclosed herein is compared with two baselines. The first baseline is Ridge Regression (RR) which has previously been used (see Palatucci et al., "Zero-shot learning with semantic output codes" in NIPS, 2009) to map input features to output attribute labels. In a nutshell, RR optimizes a regularized quadratic loss for which there exists a closed-form formula. The second baseline is the standard SSVM multiclass objective function. For these experiments, the attribute vectors are encoded in a binary fashion (using $\{0,1\}$) and $l_2$-normalized.

Table 1 shows that the multiclass and ranking objectives perform on par. They outperform significantly ridge regression. This is not surprising, since the two former objective functions are more closely related to the end goal which is classification. In what follows, the ranking framework is exclusively used to learn the parameters of our model.

TABLE 1

Comparison of different objective functions

|  | RR | Multi | Rank |
| --- | --- | --- | --- |
| AWA | 30.7 | 37.7 | 37.4 |
| CUB | 13.3 | 16.4 | 18.0 |

Different approaches to embed attributes were next compared. Experiment included a $\{0,1\}$ embedding, a $\{-1, +1\}$ embedding and a mean-centered embedding (in which, starting from the $\{0,1\}$ embedding, the mean is computed over all learning classes and subtracted). Underlying the $\{0,1\}$ embedding is the assumption that the presence of the same attribute in two classes should contribute to their similarity, but not its absence. Underlying the $\{-1,1\}$ embedding is the assumption that the presence or the absence of the same attribute in two classes should contribute equally to their similarity. As for mean-centered attributes, they take into account the fact that some attributes appear more frequently than others. For instance, if an attribute appears in almost all classes, then in the mean-centered embedding, its absence will contribute more to the similarity than its presence. Experiments were also directed to the $l_2$-normalization of the embedded attribute vectors. The $l_2$-normalization enforces that each class is closest to itself according to the dot-product similarity. From the results in Table 2, it can be concluded that all embeddings perform similarly, especially after $l_2$-norm. In what follows, the $\{0,1\}$ embedding with $l_2$-norm is exclusively used.

TABLE 2

Comparison of different attribute embeddings

|  | $\{0, 1\}$ | $\{-1, +1\}$ | mean-centered |
|---|---|---|---|
| AWA |  |  |  |
| no $l_2$-norm | 37.3 | 37.3 | 36.9 |
| with $l_2$-norm | 37.4 | 37.3 | 36.6 |
| CUB |  |  |  |
| no $l_2$-norm | 16.3 | 17.9 | 16.5 |
| with $l_2$-norm | 18.0 | 17.9 | 17.2 |

The disclosed ALE framework was compared to the DAP baseline of Lampert et al., "Learning to detect unseen object classes by between-class attribute transfer", in CVPR, 2009. In DAP, given a new image x, it is assigned to the class y with the highest posterior probability:

$$p(y|x) \propto \prod_{e=1}^{E} p(a_e = \rho_{y,e} | x) \quad (12)$$

where $\rho_{y,e}$ is the association measure between attribute $a_e$ and class y, and $p(a_e=1|x)$ is the probability that image x contains attribute e. For each attribute, one linear classifier is trained on the Fisher vectors. A (regularized) logistic loss is used which provides an attribute classification accuracy similar to the SVM but with the added benefit that its output is directly a probability. From the results presented in Table 3 (left columns), it can be seen that the disclosed ALE framework performs slightly better than DAP on the AWA dataset and performs significantly better on the CUB dataset. This can be interpreted as suggesting that the ALE approach is more beneficial when the attribute quality is higher. A benefit of the ALE approach as compared with DAP is that the objective function in ALE optimizes a ranking objective which is closely related to the classification end-goal. Additionally, ALE takes into account implicitly any correlations between classes.

TABLE 3

Comparison of the DAP baseline with ALE

|  | Obj. pred. (top-1 in %) | | Att. pred. (AUC, in %) | |
|---|---|---|---|---|
|  | DAP | ALE | DAP | ALE |
| AWA | 36.1 | 37.4 | 71.9 | 65.7 |
| CUB | 10.5 | 18.0 | 61.8 | 60.3 |

Attribute interpretability is next considered. In ALE, each column of the W parameters matrix can be interpreted as an attribute classifier, and in operation 44 of the inference phase 4 the expression $\theta(x)^T W$ can be interpreted as a vector of attribute scores for the input image x. However, unlike in DAP, the ALE approach of FIG. 1 does not optimize for attribute classification accuracy. This might be viewed as a disadvantage of ALE insofar as it potentially loses attribute interpretability, which is an important property of attribute-based systems such as DAP when, for instance, one wants to include a human in the loop. To determine whether this expectation of lost attribute information in ALE actually comes to pass, the attribute prediction accuracy was measured for both DAP and ALE (the latter using $\theta(x_{in})^T W$ of the input image $x_{in}$ undergoing classification as the attribute scores—note that these scores do not depend on the class $y_j$ or its attribute vector $\varphi(y_j)$). For each attribute, following Lampert et al., CVPR 2009, the attribute prediction accuracy (AUC) was measured on the "test" set of the evaluation classes and report the mean. Results are shown in Table 3 (right columns, reported in %). As expected, the attribute prediction accuracy of DAP is higher than that of the ALE approach disclosed herein. This is due to the fact that DAP optimizes directly the attribute-classification accuracy. However, the AUC for the ALE approach is still reasonable, especially on the CUB dataset, where only a 1.5% decrease in AUC is observed between DAP and ALE. Thus, the ALE-learned terms $\theta(x)^T W$ are interpretable as attribute classifiers with a reasonably high degree of accuracy.

Attribute correlation is next considered. In experiments, the output space dimensionality was reduced and the impact on the classification accuracy was studied. Two different techniques were explored: Singular Value Decomposition (SVD) and attribute sampling. For SVD, we learn on the AWA dataset (resp. the CUB dataset) the SVD on the 40×85 (resp. 150×312) $\Phi^A$ matrix and then project the remaining 10 (resp. 50) evaluation classes in this space. For the sampling, a fixed number of attributes was sub-sampled and the experiments repeated 10 times with different sub-samplings. From these experiments, it was concluded that there is a significant amount of correlation between attributes and that the output space dimensionality can be significantly reduced with little accuracy loss. For instance, on the AWA dataset the accuracy decreased from 37.4 to 35.7 when reducing from an 85-dimensional space to a 10-dimensional space. On the CUB dataset the accuracy decreased from 18.0 to 17.2 when reducing from a 312-dimensional space to a 20-dimensional space. As expected, SVD outperformed a random sampling of the attribute dimensions.

While image attributes can be a useful source of prior information to embed classes, other types of class attributes can be used. In the following experiments, the class attributes were derived from the Wordnet hierarchy (available at the hyperlink wordnet.princeton.edu). From Wordnet, the set of ancestors of the 50 AWA (resp. 200 CUB) classes were collected, and a hierarchy with 150 (resp. 299) nodes was built. (In some cases, some of the nodes have a single child. The automatically obtained hierarchy was not cleaned.) The $\{0,1\}$ embedding with $l_2$-normalization was used. A combination of image attributes and hierarchy attributes was also considered. Various combinations were investigated, such as the concatenation of the embeddings or performing CCA on the embeddings. The simpler concatenation alternative always outperformed the more complex CCA and therefore only results with the former approach are reported here. Results are shown in Table 4, where "Image attributes" denotes the ALE method using image attributes, "Hierarchy attributes" denotes ALE using hierarchy attributes, and "Combined attributes" denotes their combination by simple concatenation. On the AWA dataset, ALE using hierarchy attributes performed slightly better than ALE using image attributes. On the other hand, for the CUB dataset, ALE using image attributes performed significantly better than ALE using hierarchy attributes. This may reflect the difference that the CUB image attributes were obtained in a more controlled and exhaustive manner than the AWA image attributes. Also, since CUB is a finer-grained dataset than AWA, the CUB hierarchy is much "flatter" than the AWA hierarchy and, therefore, not as informative. On the AWA dataset, the ALE with combined attributes performed better than ALE with either image attributes alone or with hierarchy attributes alone; whereas on CUB, there is no improvement through the combination. The latter result is believed to be because the relatively flat CUB hierarchy adds little additional information to the relatively "better" CUB image attributes. These results can be interpreted as suggesting that a class hierarchy can be used as a complementary source of information for augmenting image attributes of "low quality" in ALE.

TABLE 4

Comparison of ALE using various attribute sets

|  | Image attributes | Hierarchy attributes | Combined attributes |
|---|---|---|---|
| AWA | 37.4 | 39.0 | 43.5 |
| CUB | 18.0 | 12.1 | 17.0 |

Experimental results are next reported for incremental learning transitioning from zero-shot learning to learning with a few examples (shots). In the "few shots" experiments, it is assumed that a few (2, 5, 10, etc.) training samples are available for each of the 10 AWA (resp. 50 CUB) evaluation classes plus all training samples from the remaining 40 AWA (resp. 150 CUB) classes to learn and cross-validate classifiers. Evaluation is done on the "test" set of the 10 AWA (resp. 50 CUB) classes. The ALE is compared with WSABIE (Weston et al., ECML, 2010) which performs label embedding and therefore "shares" samples between classes, but does not use prior information. For both ALE and WSABIE, the parameters matrix W was initialized to the matrix learned in the zero-shot experiments.

Figure 5:
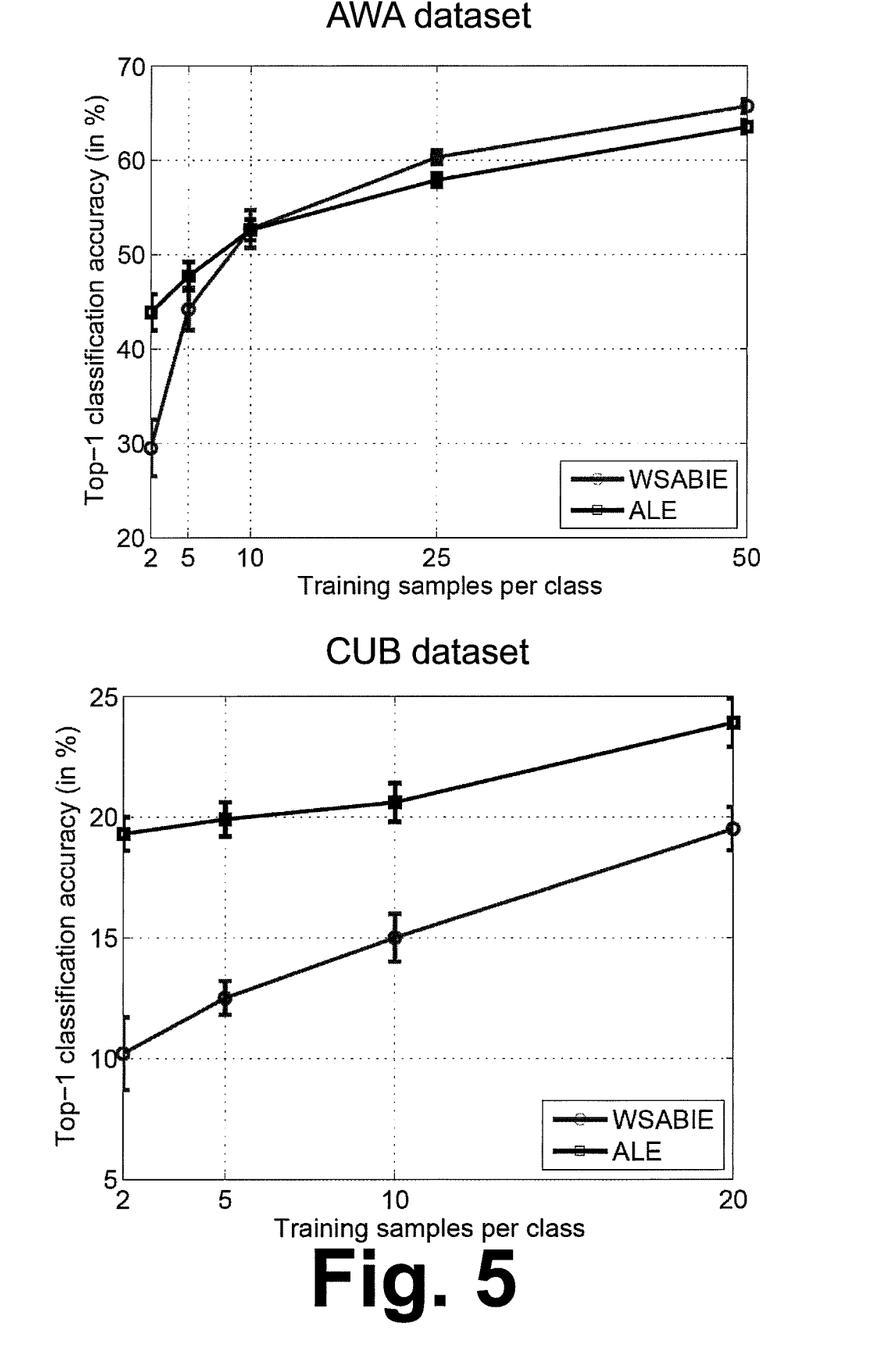
FIG. 5 depicts plots of experimental results as described herein.

With reference to FIG. 5, results of the incremental learning are plotted. For the AWA dataset (top plot of FIG. 5), ALE outperforms WSABIE significantly for a small amount of training data, but is outperformed by WSABIE for 25 training samples per class or more. One advantage of WSABIE with respect to ALE is that the embedding space dimensionality can be tuned, thus giving more flexibility when larger amounts of training data become available. On the other hand, on the CUB dataset ALE always outperformed WSABIE. Note that the maximum number of training samples per class used for the CUB dataset was 20 because the least populated class has only 42 samples (21 training). As an example, ALE with 2 training samples performs on par with WSABIE with 20 training samples, showing that attributes can compensate for limited training data.

Training the disclosed ALE-based classifier is efficient. Using a single processor of a Linux server with 2.4 GHz Intel Xeon processors and 32 GB of RAM, the training takes approximately three hours to learn ALE for the CUB dataset with combined image and hierarchy parameters and with 65,536-dimensional Fisher vectors representing the images.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform an image cataloging method including the operations of:

representing classes of a set of classes $Y=\{y_j, j=1, \ldots, C\}$ by class attribute vectors $\varphi(y_j)$ where $\varphi$ is an embedding function that embeds a class in an attribute space of dimensionality E where each dimension $a_i$, $i=1, \ldots, E$ of the attribute space corresponds to a class attribute of a set of E class attributes;

representing training images $x_n$ labeled by respective training image class labels $y_n$ as $\theta(x_n)$ where $\theta$ is an embedding function that embeds an image in an image feature space of dimensionality D image features, the training images not being labeled with class attributes of the attribute space of dimensionality E;

optimizing, respective to the training images, a set of parameters w of a prediction function $$f(x; w) = \underset{y \in Y}{\mathrm{argmax}} \{\theta(x)' W \varphi(y)\}$$

where x denotes an image and y denotes a class of the set of classes Y and where W is a D×E matrix representing the set of parameters w of the prediction function $f(x;w)$ wherein the training images respective to which the set of parameters w of the prediction function $f(x;w)$ is optimized do not include training images that are labeled with class attributes of the set of E class attributes;

applying the prediction function $f(x;w)$ with the optimized set of parameters W to an input image to generate at least one class label for the input image; and cataloging the input image using the at least one class label for the input image, the cataloging including storing the input image or a pointer to the input image in an images database structured by image class.

2. The non-transitory storage medium as set forth in claim 1 wherein the applying does not include applying image attribute classifiers to the input image.

3. The non-transitory storage medium as set forth in claim 1 wherein the class attributes of the attribute space include image attributes.

4. The non-transitory storage medium as set forth in claim 3 wherein the set of classes Y comprises a hierarchy of classes and the class attributes of the attribute space further include class hierarchy attributes derived from the hierarchy of classes.

5. The non-transitory storage medium as set forth in claim 1 wherein the set of classes Y comprises a hierarchy of classes and the class attributes of the attribute space include class hierarchy attributes derived from the hierarchy of classes.

6. The non-transitory storage medium as set forth in claim 1 wherein the applying further includes:

generating class attribute scores for the input image for class attributes of the attribute space based on $\theta(x_{in})'W$ where $x_{in}$ denotes the input image.

7. The non-transitory storage medium as set forth in claim 1 wherein the optimizing includes optimizing at least one of a ranking objective, a multiclass objective, and a regression objective.

8. The non-transitory storage medium of claim 1 further comprising:

receiving assignments of class attributes of the set of class attributes to classes of the set of classes;

wherein the representing of the classes by class attribute vectors $\varphi(y_j)$ uses the received assignments of class attributes to the classes.

9. An apparatus for performing image retrieval, the apparatus comprising:
an electronic data processing device programmed to perform a method including the operations of:
receiving assignments of class attributes of a set of class attributes to classes of a set of classes;
embedding classes of the set of classes $Y=\{y_j, j=1,\ldots,C\}$ in an attribute space of dimensionality E using the received assignments of class attributes to the classes, where each dimension $a_i$, $i=1,\ldots,E$ of the attribute space corresponds to a class attribute of the set of E class attributes;
embedding training images $x_n$ labeled by respective training image class labels $y_n$ in an image feature space of dimensionality D image features wherein none of the training images are labeled with class attributes of the attribute space;
optimizing a set of parameters w of a prediction function $$y = f(x; w) = \underset{y \in Y}{\operatorname{argmax}}\{\theta(x)' W \varphi(y)\}$$

operating in the image feature space and in the attribute space, where $\theta$ is an embedding function used in embedding the training images, $\varphi$ is an embedding function used in embedding the classes, and W is a parameters matrix representing the set of parameters w, respective to the training images wherein x denotes an image and y denotes the predicted class label for the image x such that the prediction function $y=f(x;w)$ with the optimized set of parameters w optimally predicts the training image class labels $y_n$ for the training images and wherein the training images respective to which the set of parameters w of the prediction function y is optimized do not include training images that are labeled with class attributes of the set of E class attributes;
applying the prediction function $y=f(x;w)$ with the optimized set of parameters w to an input image to generate at least one class label for the input image;
searching an images database to identify images with the same or similar class labels to the at least one class label generated for the input image; and
retrieving the identified images from the images database.

10. The apparatus of claim 9 wherein each dimension $a_i$, $i=1,\ldots,E$ of the attribute space corresponds to a class attribute comprising an image attribute.

11. The apparatus of claim 9 wherein each dimension $a_i$, $i=1,\ldots,E$ of the attribute space corresponds to a class attribute comprising one of an image attribute and a class hierarchy attribute.

* * * * *